United States Patent
Lim et al.

(10) Patent No.: US 8,305,875 B2
(45) Date of Patent: Nov. 6, 2012

(54) METHOD FOR ALLOCATING FREQUENCY DOMAIN SPREAD CODE IN BASE STATION OF MC-CDMA COMMUNICATION SYSTEM

(75) Inventors: Hyung-Soo Lim, Daejeon (KR); Yu-Ro Lee, Seoul (KR); Dong-Seung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1184 days.

(21) Appl. No.: 12/096,874

(22) PCT Filed: Jul. 25, 2006

(86) PCT No.: PCT/KR2006/002924
§ 371 (c)(1),
(2), (4) Date: Jun. 10, 2008

(87) PCT Pub. No.: WO2007/066871
PCT Pub. Date: Jun. 14, 2007

(65) Prior Publication Data
US 2008/0291820 A1    Nov. 27, 2008

(30) Foreign Application Priority Data
Dec. 10, 2005   (KR) .................. 10-2005-0121368

(51) Int. Cl.
*H04J 11/00*   (2006.01)
*H04B 7/216*   (2006.01)
(52) U.S. Cl. ........................ 370/209; 370/335
(58) Field of Classification Search ............ None
See application file for complete search history.

(56) References Cited

U.S. PATENT DOCUMENTS

| 6,987,747 B1 * | 1/2006 | Mottier et al. ............ 370/335 |
| 2002/0044540 A1 * | 4/2002 | Mottier et al. ............ 370/335 |
| 2003/0112744 A1 * | 6/2003 | Baum et al. ............ 370/206 |

(Continued)

FOREIGN PATENT DOCUMENTS

| GB | 2411555 A | 8/2005 |
| WO | 2004/109953 A1 | 12/2004 |

OTHER PUBLICATIONS

D. Mottier, D. Castelain, "A Spreading Sequence Allocation Procedure for MC-CDMA Transmission Systems", Proc IEEE VTC'2000, Sep. 2000, pp. 1270-1275.*

(Continued)

*Primary Examiner* — Chirag Shah
*Assistant Examiner* — Suk Jin Kang
(74) *Attorney, Agent, or Firm* — Kile Park Goekjian Reed & McManus PLLC

(57) ABSTRACT

The present invention relates to a method for allocating a frequency domain spread code in a base station of a multi-carrier code division multiple access (MC-CDMA) communication system. A code allocation priority is established based on interference between previously allocated spread codes and a newly allocated spread code so as to minimize the interference caused by channel fading or a synchronization error according to a transmitting or receiving timing offset when a scheduler of the base station in the MC-CDMA communication system allocates a subcarrier group to the plurality of user terminals or channels, and the spread code is allocated to the plurality of user terminals or channels according to the established priority, by the scheduler of the base station.

20 Claims, 5 Drawing Sheets

WH code length = 4 (SF=4)

| Initial allocation code | Code allocation order |
|---|---|
| 1 | 1-4-2-3 |
| 2 | 2-3-1-4 |
| 3 | 3-2-4-1 |
| 4 | 4-1-3-2 |

U.S. PATENT DOCUMENTS

| | | | |
|---|---|---|---|
| 2003/0112787 A1* | 6/2003 | Mottier | 370/342 |
| 2004/0081227 A1* | 4/2004 | Lim et al. | 375/140 |
| 2004/0141481 A1* | 7/2004 | Lee et al. | 370/335 |
| 2005/0111348 A1* | 5/2005 | Mottier et al. | 370/208 |
| 2005/0111425 A1* | 5/2005 | Mottier et al. | 370/342 |
| 2005/0135460 A1* | 6/2005 | Akita | 375/148 |
| 2005/0141598 A1* | 6/2005 | Akita | 375/148 |
| 2005/0286460 A1* | 12/2005 | Mottier et al. | 370/328 |
| 2007/0133474 A1* | 6/2007 | Farkas et al. | 370/335 |

OTHER PUBLICATIONS

Analysis of the Influence of Walsh-Hadamard Code Allocation Strategies on the Performance of Multi-Carrier CDMA Systems in the Presence of HPA Non-Linearities, N. Hathi et al., PIMRC 2002.
PCT International Search Report of PCT/KR2006/002924.
PCT Written Opinion of International Search Authority for PCT/KR2006/002924.

* cited by examiner

【Figure 1】
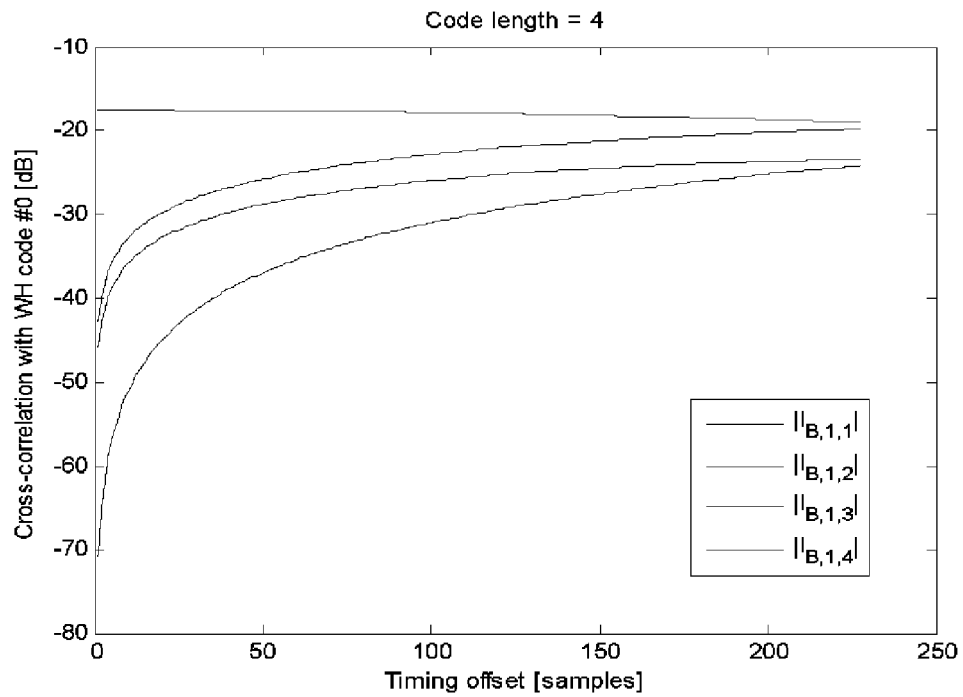
【Figure 2】
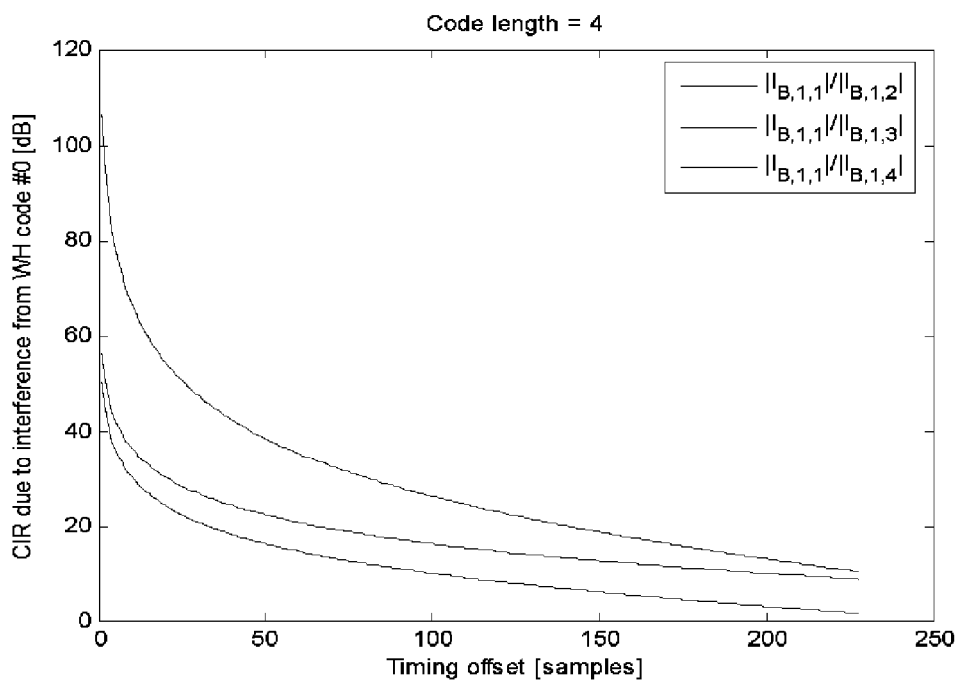

【Figure 3】
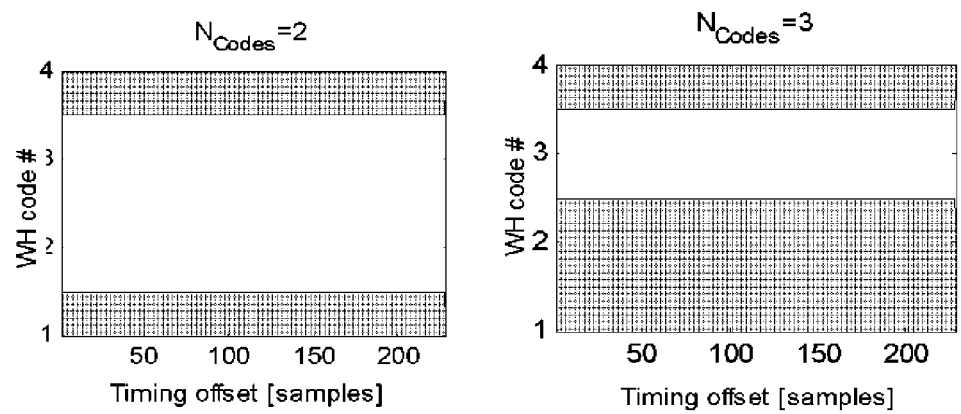
【Figure 4】
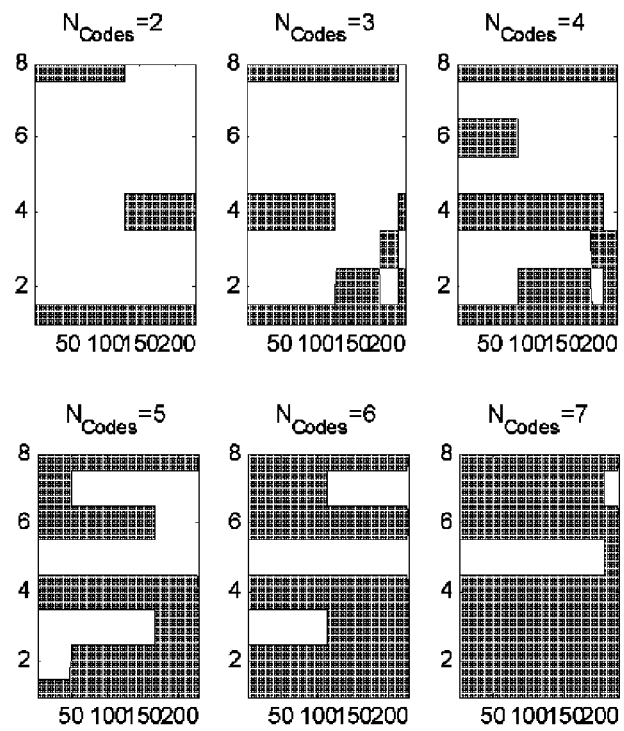

【Figure 5】
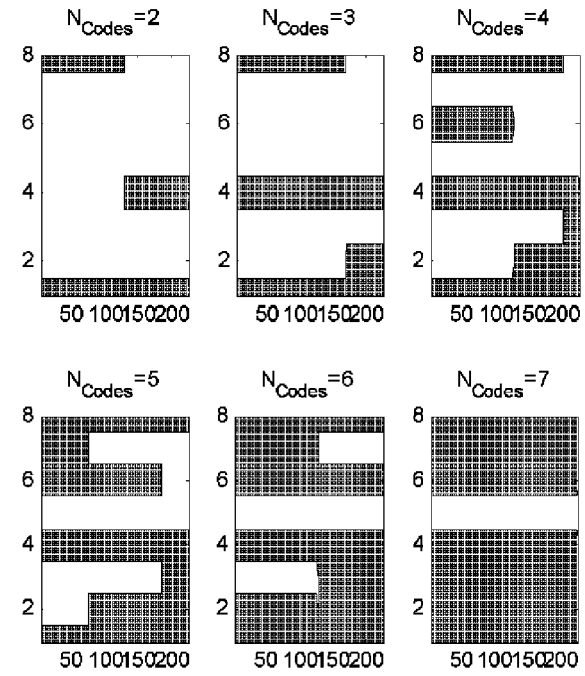
【Figure 6】
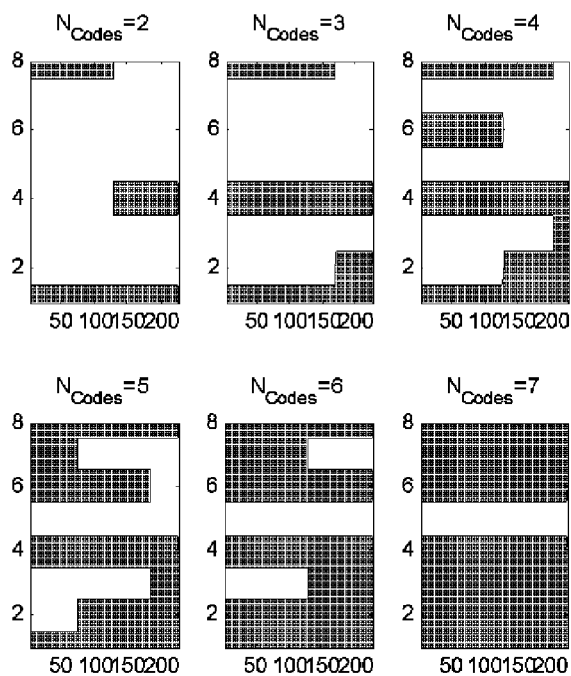

【Figure 7】
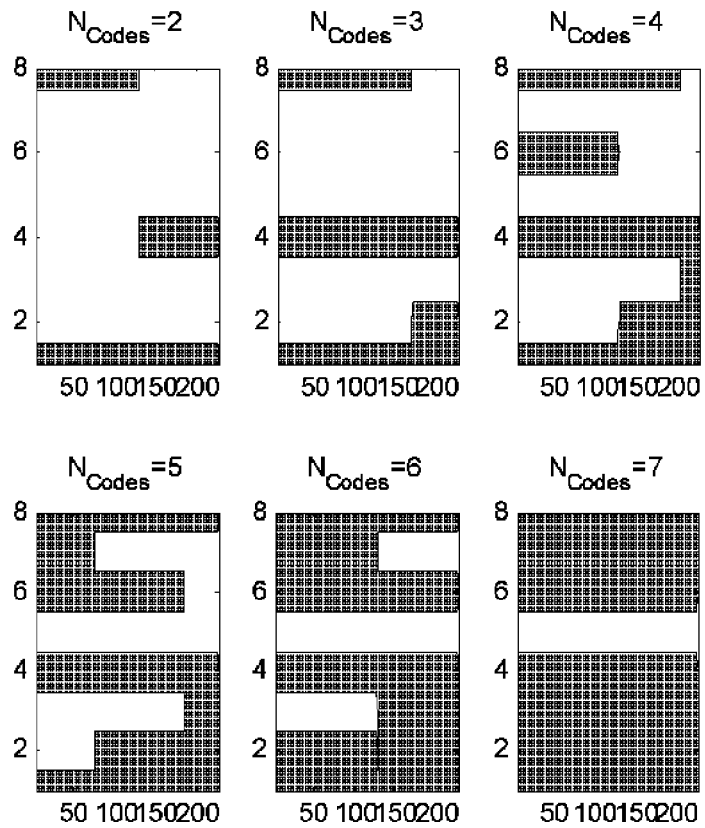
【Figure 8】
WH code length = 4 (SF=4)
| Initial allocation code | Code allocation order |
|---|---|
| 1 | 1-4-2-3 |
| 2 | 2-3-1-4 |
| 3 | 3-2-4-1 |
| 4 | 4-1-3-2 |

[Figure 9]

WH code length = 8 (SF=8)

| Initial allocation code | Code allocation order |
|---|---|
| 1 | 1-8-4-6-7-2-3-5 |
| 2 | 2-7-3-5-8-1-4-6 |
| 3 | 3-6-2-8-5-4-1-7 |
| 4 | 4-5-1-7-6-3-2-8 |
| 5 | 5-4-8-2-3-6-7-1 |
| 6 | 6-3-7-1-4-5-8-2 |
| 7 | 7-2-6-4-1-8-5-3 |
| 8 | 8-1-5-3-2-7-6-4 |

[Figure 10]

WH code length = 16 (SF=16)

| Initial allocation code | Code allocation order |
|---|---|
| 1 | 1-16-8-12-14-15-4-6-7-10-11-13-2-3-5-9 |
| 2 | 2-15-7-11-13-16-3-5-8-9-12-14-1-4-6-10 |
| 3 | 3-14-6-10-16-13-2-8-5-12-9-15-4-1-7-11 |
| 4 | 4-13-5-9-15-14-1-7-6-11-10-16-3-2-8-12 |
| 5 | 5-12-4-16-10-11-8-2-3-14-15-9-6-7-1-13 |
| 6 | 6-11-3-15-9-12-7-1-4-13-16-10-5-8-2-14 |
| 7 | 7-10-2-14-12-9-6-4-1-16-13-11-8-5-3-15 |
| 8 | 8-9-1-13-11-10-5-3-2-15-14-12-7-6-4-16 |
| 9 | 9-8-16-4-6-7-12-14-15-2-3-5-10-11-13-1 |
| 10 | 10-7-15-3-5-8-11-13-16-1-4-6-9-12-14-2 |
| 11 | 11-6-14-2-8-5-10-16-13-4-1-7-12-9-15-3 |
| 12 | 12-5-13-1-7-6-9-15-14-3-2-8-11-10-16-4 |
| 13 | 13-4-12-8-2-3-16-10-11-6-7-1-14-15-9-5 |
| 14 | 14-3-11-7-1-4-15-9-12-5-8-2-13-16-10-6 |
| 15 | 15-2-10-6-4-1-14-12-9-8-5-3-16-13-11-7 |
| 16 | 16-1-9-5-3-2-13-11-10-7-6-4-15-14-12-8 |

METHOD FOR ALLOCATING FREQUENCY DOMAIN SPREAD CODE IN BASE STATION OF MC-CDMA COMMUNICATION SYSTEM

TECHNICAL FIELD

The present invention relates to a frequency domain spread code allocation method of a multi-carrier code division multiple access (MC-CDMA) communication system. More particularly, the present invention relates to a frequency domain spread code allocation method for allocating a code according to a spread code allocation priority so that interference between Walsh-Hadamard (WH) orthogonal codes may be minimized, in a base station of a multi-carrier code division multiple access (MC-CDMA) communication system.

BACKGROUND ART

A base station in a conventional communication system allocates a plurality of spread codes designed to be spread at a frequency domain to each cell or sector, and uses different codes for respective user terminals or respective channels. That is, the base station selects a predetermined spread code from among available spread codes that are not allocated to a user terminal or a channel, and allocates the selected spread code to a new user terminal or a new channel.

There are two types of frequency domain spread codes. One is an orthogonal code, and the other is a quasi-orthogonal code.

When a length of the frequency domain spread code in the orthogonal codes is considerably short compared to a variation of a channel gain at the frequency domain, a receiver may completely separate more than two code signals and receive the same without interference between the codes due to orthogonality when more than two respective codes for one subcarrier combination are modulated and transmitted.

There is interference between the quasi-orthogonal codes.

In the orthogonal code, there are a number of spread codes, the number corresponding to a given frequency domain spreading factor. However, since more spread codes may exist in the quasi-orthogonal code compared to the orthogonal code, more user terminals or channels may be accepted.

However, the orthogonal code is widely used since it is easy to be designed and realized, and it has an advantage in using an orthogonal variable spreading factor (OVSF).

When the orthogonal code is used as the frequency domain spread code in the MC-CDMA communication system, the base station may use any of given orthogonal codes in an ideal channel situation and a timing and frequency synchronization situation, and it will cause no difference.

However, when a signal distortion occurs at a frequency spreading domain due to a channel error or a synchronization error for the user terminal, the orthogonality between the spread codes is broken, and interference between the codes may occur.

The above information disclosed in this Background section is only for enhancement of understanding of the background of the invention and therefore it may contain information that does not form the prior art that is already known in this country to a person of ordinary skill in the art.

DISCLOSURE

Technical Problem

The present invention has been made in an effort to provide a method for allocating a frequency domain spread code in a base station of a multi-carrier code division multiple access (MC-CDMA) communication system, so as to minimize an interference between WH codes by allocating a WH orthogonal code according to a priority to identify a plurality of user terminal signals or channel signals in the base station.

Technical Solution

In an exemplary method for allocating a frequency domain spread code by a base station of an MC-CDMA communication system having a plurality of user terminals and a scheduler according to an embodiment of the present invention, a) a code allocation priority is established based on interference between previously allocated spread codes $C_A$ and a newly allocated spread code $C_i$ so as to minimize interference caused by channel fading or a synchronization error according to a transmitting or receiving timing offset, when the scheduler of the base station allocates a subcarrier group to the plurality of user terminals or channels, and b) the spread code is allocated to the plurality of user terminals or channels according to the established priority by the scheduler of the base station.

In an exemplary method for allocating a frequency domain spread code by a base station of a multi-carrier code division multiple access (MC-CDMA) communication system having a plurality of user terminals and a scheduler according to another embodiment of the present invention, a) a spread code allocation priority is established based on a carrier-to-interference ratio (CIR) obtained from signals using the previously allocated spread codes and the newly allocated spread code, so as to minimize an interference between codes that is caused by channel fading or a synchronization error according to a transmitting or receiving timing offset, when the scheduler of the base station allocates a subcarrier group to the plurality of user terminals or channels, and b) the spread code is allocated to the plurality of user terminals or channels according to the established spread code allocation priority by the scheduler of the base station.

Advantageous Effects

According to the exemplary embodiment of the present invention, in the base station of the MC-CDMA communication system using multi-carriers, since the optimum allocation order of the codes to be used according to its priority among the spread codes provided by using a plurality of carriers is determined when the WH code is allocated, the interference caused by the channel fading or the timing offset may be minimized between the codes.

In addition, the interference caused by the channel fading or the timing offset is minimized between the codes, the interference affecting the MC-CDMA link is minimized, and therefore unnecessary performance degradation may be reduced.

DESCRIPTION OF DRAWINGS

FIG. 1 shows a graph representing an auto-correlation and a cross-correlation of WH codes according to a timing offset, according to an exemplary embodiment of the present invention.

FIG. 2 shows a graph for representing a carrier-to-interference ratio (CIR) caused by interference between the WH codes according to the timing offset, according to the exemplary embodiment of the present invention.

FIG. 3 shows a diagram representing a result obtained by simulating an optimum spread code allocation priority when the WH code having a code length of 4 is used as a frequency domain spread code according to the exemplary embodiment of the present invention.

FIG. 4 shows a result obtained by simulating a method for designing the optimum spread code allocation priority in an order for minimizing interference between codes when the WH code having the code length 8 is used as the frequency domain spread code according to the exemplary embodiment of the present invention.

FIG. 5 shows a result obtained by simulating a method for designing the optimum spread code allocation priority in an order for maximizing the CIR caused by the interference between codes when the WH code having the code length 8 is used as the frequency domain spread code according to the exemplary embodiment of the present invention.

FIG. 6 shows a result obtained by simulating a method for designing the optimum spread code allocation priority in an order for minimizing a maximum value of the interference between codes when the WH code having the code length 8 is used as the frequency domain spread code according to the exemplary embodiment of the present invention.

FIG. 7 shows a result obtained by simulating a method for designing the optimum spread code allocation priority in an order for maximizing a minimum value of the CIR caused by the interference between codes when the WH code having the code length 8 is used as the frequency domain spread code according to the exemplary embodiment of the present invention.

FIG. 8 shows an optimum spread code allocation priority design result according to an initial allocation code when the timing offset is less (timing offset <47 samples) and the WH code having the code length of 4 (SF=4) is used as the frequency domain spread code, according to the exemplary embodiment of the present invention.

FIG. 9 shows the optimum spread code allocation priority design result according to the initial allocation code when the timing offset is less (the timing offset <47 samples) and the WH code having the code length of 8 (SF=8) is used as the frequency domain spread code, according to the exemplary embodiment of the present invention.

FIG. 10 shows the optimum spread code allocation priority design result according to the initial allocation code when the timing offset is less (the timing offset <47 samples) and the WH code having the code length of 16 (SF=16) is used as the frequency domain spread code, according to the exemplary embodiment of the present invention.

BEST MODE

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature, and not restrictive. Like reference numerals designate like elements throughout the specification.

Throughout this specification and the claims which follow, unless explicitly described to the contrary, the word "comprise" or variations such as "comprises" or "comprising" will be understood to imply the inclusion of stated elements but not the exclusion of any other elements. In addition, the word "module" will be understood to indicate a unit for processing a predetermined function or operation, which may be realized by hardware, software, or a combination thereof.

An exemplary embodiment of the present invention will hereinafter be described in detail with reference to the accompanying drawings.

The present invention provides a method for a base station to select a spread code, allocate the selected spread code, and determine a priority in a system performing a frequency domain spreading operation to classify user terminals or channels according to a signaling method having a plurality of subcarriers in a frequency domain.

In an exemplary embodiment of the present invention, a multicarrier code division multiple access (MC-CDMA) system using a Walsh-Hadamard (WH) orthogonal code as a frequency domain spread code in an orthogonal frequency division multiplexing (OFDM) signaling method will be exemplified.

There are two standards to select and allocate the spread code.

Firstly, one of the two standards is interference intensity applied by the newly allocated spread code to the user terminal or the channel signal having used the previously allocated spread code.

Secondly, the other of the two standards is interference intensity applied to the signal that is used for the newly allocated spread code from the user terminal or the channel signal having used the previously allocated spread code. The above two interferences are the same when both the previously allocated spread code and the newly allocated spread code are considered, but they may have different results when signals using the previously allocated spread code are considered.

A base station considers the interference occurring at the signal using a newly allocated spread code $C_i$ by the user terminal signal or the channel signal using the previously allocated spread code $C_A$.

When a combination of frequency domain spread codes having a spread code length of a spreading factor (SF) is given as $\{C_k\}$ (k=0, 1, 2, ... SF−1), the interference $|I_{A,i}|$ occurring at the previously allocated spread codes $C_A$ by the signal allocated to the newly allocated spread code $C_i$ may be given as Math FIG. 1.

$$|I_{A,i}| = \left| \sum_{c_j \in C_A} \sum_{k=0}^{SF-1} c_i^*[k] c_j[k] e^{j 2\pi \frac{k+k_0}{N} \frac{\tau_e}{T_s}} \right| \quad \text{[Math FIG. 1]}$$

In Math FIG. 1, SF denotes a frequency domain spreading factor that indicates a length of the frequency domain spread code.

N denotes a degree of fast Fourier transform (FFT) of an orthogonal frequency division multiplexing (OFDM) signal. $\tau_e$ denotes a timing offset. $T_s$ denotes a sample length of the OFDM signal. $k_0$ denotes an index of a first subcarrier of a subcarrier group applied to the frequency domain spread code.

A spread code $C_A^\dagger$ having the minimum interference occurring by the signal using the previously applied spread code $C_A$ may be obtained as shown in Math FIG. 2.

$$c_A^\dagger = \underset{c_i \notin C_A}{\operatorname{argmin}} |I_{A,i}| \quad \text{[Math FIG. 2]}$$

In the exemplary embodiment of the present invention, a spread code selecting method in Math FIG. 2 will be referred to as a method A.

$C_A$ denotes a combination of the previously allocated spread codes.

$C_i$ denotes the newly allocated spread codes that are not included in the combination $C_A$.

$I_{A,i}$ denotes the interference occurring at the newly allocated spread code $C_i$ by the signals using the previously allocated spread code $C_A$.

$c_A^\dagger$ denotes a spread code having the minimum interference at the user terminal signal or the channel signal using the previously allocated spread code $C_A$.

In addition, $c_A^\dagger$ denotes an optimum spread code selected in the method A.

In this case, the interference at a plurality of user terminal or channel signals using the previously allocated spread code $C_A$ is measured to determine an optimum allocation code.

When the optimum allocation code is determined, the followings are considered.

In a method B-1, a spread code minimizing the interference between the spread codes is selected for signals having the maximum interference caused by the signal applied to the newly allocated spread code $c_i$ among the signals using the previously allocated spread code $C_A$.

In a method B-2, the spread code minimizing an average interference occurring at the signals using the previously allocated spread code $C_A$ by the signal using the newly allocated spread code $C_i$ is selected.

The base station prevents performance deterioration by minimizing performance reduction of the user terminal or the channel having the worst MC-CDMA link performance in the method B-1, and minimizes performance disparity between the respective user terminals or the channels.

The average performance is only considered in the method B-2.

An interference $I_{B,i,j}$ caused by the signal allocated to the newly allocated spread code $c_i$ at a signal using a predetermined spread code $c_j$ among the previously allocated spread code $C_A$ may be given as Math FIG. 3.

$$I_{B,i,j} = \sum_{k=0}^{SF-1} c_i^*[k] c_j[k] e^{j2\pi \frac{k+k_0}{N} \frac{\tau_e}{T_s}}$$ [Math FIG. 3]

In Math FIG. 3, $I_{B,i,j}$ denotes the interference between codes when the newly allocated spread code $c_i$ and the predetermined spread code $c_j$ are concurrently received through frequency resources according to a timing offset $\tau_e$|.

SF is a frequency domain spreading factor, and denotes a length of the frequency domain spread code.

$c_i[k]$ denotes a value of a $k^{th}$ element of the newly allocated spread code $c_i$ (k=0, 1, . . . , SF−1). $k_o$ denotes a subcarrier index transmitted by the first element $c_i[0]$ of the newly allocated spread code $c_i$.

N denotes a degree of a fast Fourier transform of the OFDM signal.

$\tau_e$ denotes a timing offset. $T_s$ denotes a sample length of the OFDM signal.

By using Math FIG. 3, the optimum code selecting methods using the method B-1 and the method B-2 may be respectively shown as Math FIG. 4 and Math FIG. 5.

$$c_{B1}^\dagger = \underset{c_i \notin C_A}{\operatorname{argmin}} \left\{ \underset{c_j \in C_A}{\max} |I_{B,i,j}| \right\}$$ [Math FIG. 4]

In Math FIG. 4, $c_{B1}^\dagger$ denotes an optimum spread code selected in the method B-1. The predetermined spread code $c_j$ indicates a dummy variable indicating a spread code in the combination $C_A$ of the previously allocated spread codes.

$$c_{B2}^\dagger = \underset{c_i \notin C_A}{\operatorname{argmin}} \sum_{c_j \in C_A} |I_{B,i,j}|^2$$ [Math FIG. 5]

In Math FIG. 5, $c_{B2}^\dagger$ denotes an optimum spread code selected in the method B-2.

The interference between codes is only considered in Math FIG. 4 and Math FIG. 5. Since an auto-correlation function of the respective spread codes is attenuated when a channel gain variation or a synchronization error occurs, a carrier-to-interference ratio (CIR), in addition to the interference between codes, is considered in Math FIG. 6, Math FIG. 7, and Math FIG. 8.

The optimum spread code selecting methods based on the CIRs corresponding to Math FIG. 2, Math FIG. 4, and Math FIG. 5 are respectively given as Math FIG. 6, Math FIG. 7, and Math FIG. 8.

$$c_A^\dagger = \underset{c_i \notin C_A}{\operatorname{argmax}} \frac{|I_{B,i,i}|}{|I_{A,i}|}$$ [Math FIG. 6]

$$c_{B1'}^\dagger = \underset{c_i \notin C_A}{\operatorname{argmax}} \left\{ \underset{c_j \in C_A}{\min} \frac{|I_{B,i,i}|}{|I_{B,i,j}|} \right\}$$ [Math FIG. 7]

$$c_{B2'}^\dagger = \underset{c_i \notin C_A}{\operatorname{argmax}} \sum_{c_j \in C_A} \frac{|I_{B,i,i}|^2}{|I_{B,i,j}|^2}$$ [Math FIG. 8]

Math FIG. 6, Math FIG. 7, and Math FIG. 8 are basically the same algorithms as Math FIG. 2, Math FIG. 4, and Math FIG. 5, but there is a difference in that the CIR according to the interference between codes is considered in Math FIG. 6, Math FIG. 7, and Math FIG. 8. Hereinafter, methods using Math FIG. 6, Math FIG. 7, and Math FIG. 8 will be respectively referred to as methods A', B-1', and B-2'.

However, in the method A', a spread code maximizing a $$CIR \frac{|I_{B,i,i}|}{|I_{A,i}|}$$

is selected as an optimum additional allocation spread code.

In Math FIG. 6, since $|I_{B,i,i}|$ is irrelevant to i (i is an integer over 1), the same result as the method A is obtained. Accordingly, in Math FIG. 6, the spread code having the minimum interference is denoted by $c_A^\dagger$ rather than $c_{A'}^\dagger$.

In Math FIG. 7, $c_{B1'}^\dagger$ denotes an optimum spread code selected in the method B-1'.

In Math FIG. 8, $c_{B2'}^\dagger$ denotes an optimum spread code selected in the method B-2'.

In the exemplary embodiment of the present invention, in a like manner of the assumed WH code, when respective letters forming the frequency domain spread code have the same complex magnitudes, $I_{B,i,i}$ for every spread code is shown as Math FIG. 9 since $I_{B,i,i}$ is a received auto-correlation for the same spread code.

$$|I_{B,i,i}| = K \left| \sum_{k=0}^{SF-1} e^{j2\pi \frac{k+k_0}{N} \frac{\tau_e}{T_s}} \right|$$ [Math FIG. 9]

$$= K \left| e^{j2\pi \frac{k_0}{N} \frac{\tau_e}{T_s}} \frac{1 - e^{j2\pi \frac{SF}{N} \frac{\tau_e}{T_s}}}{1 - e^{j\frac{2\pi}{N} \frac{\tau_e}{T_s}}} \right|$$

$$= K \left| \frac{\sin\left(\pi \frac{SF}{N} \frac{\tau_e}{T_s}\right)}{\sin\left(\frac{\pi}{N} \frac{\tau_e}{T_s}\right)} \right|$$

In Math FIG. 9, a constant K is shown as $K=|ci[k]|^2$. Accordingly, Math FIG. 6, Math FIG. 7, and Math FIG. 8 are respectively given as Math FIG. 2, Math FIG. 4, and Math FIG. 5 when the letters forming all the spread codes have the same complex magnitudes.

FIG. 1 shows a graph representing an auto-correlation and a cross-correlation of WH codes according to the timing offset, according to an exemplary embodiment of the present invention.

In FIG. 1, in a case of SF=4, when a WH code of no. 1 has been previously allocated and WH codes 2, 3, and 4 are additionally allocated, the interference $|I_{B,1,j}|$ between codes of signals respectively having a frequency domain spread by using the additionally allocated codes, and an auto-correlation function $|I_{B,1,1}|$ of the WH code no. 1 are illustrated.

FIG. 2 shows a graph for representing the CIR caused by the interference between the WH codes according to the timing offset, according to the exemplary embodiment of the present invention.

In FIG. 2, in the case of SF=4, when the WH code No. 1 has been previously allocated and the WH codes 2, 3, and 4 are additionally allocated, the CIR (i.e., $|I_{B,1,1}|/|I_{B,1,j}|$) at the signals having the frequency domain spread by using the additionally allocated codes is illustrated.

Accordingly, in the optimum allocation code selection method, there is a priority for minimizing the interference between codes.

After simulating the spread code selecting algorithm in the methods A, B-1, A', and B-1', the same result has been obtained in the four methods, which will be shown in FIG. 3.

FIG. 3 shows a diagram representing a result obtained by simulating the optimum spread code allocation priority when the WH code having a code length of 4 according to the exemplary embodiment of the present invention is used as the frequency domain spread code.

In FIG. 3, an initially allocated spread code is assumed to be the WH code No. 1

In the simulation, it is assumed that SF is 4, N is 2048, and the CP length is 228 samples.

In FIG. 3 to FIG. 7, an X axis shows the timing offset, and a Y axis shows an index of the allocated WH codes. A dark colored area shows an index of the optimum allocation WH code obtained by using an allocation method corresponding to a timing offset. Ncodes denotes the number of codes allocated to the user terminal.

As shown in FIG. 3, when SF=4, N=2048, and the WH code no. 1 is used as the first spread code, WH codes no. 4, no. 2, and no. 3 are sequentially allocated to the additional user terminal or channel in an optimum allocation order.

In addition, the simulation results of the timing offset having the CP length below 228 samples are equally obtained because the performance reduction caused by the timing offset is not great since the frequency bandwidth of one spread block is narrow when SF=4.

FIG. 4 shows a result obtained by simulating a method for designing the optimum spread code allocation priority in an order for minimizing the interference between codes when the WH code having the code length 8 is used as the frequency domain spread code according to the exemplary embodiment of the present invention.

FIG. 5 shows a result obtained by simulating a method for designing the optimum spread code allocation priority in an order for maximizing the CIR caused by the interference between codes when the WH code having the code length 8 is used as the frequency domain spread code according to the exemplary embodiment of the present invention.

FIG. 6 shows a result obtained by simulating a method for designing the optimum spread code allocation priority in an order for minimizing a maximum value of the interference between codes when the WH code having the code length 8 is used as the frequency domain spread code according to the exemplary embodiment of the present invention.

FIG. 7 shows a result obtained by simulating a method for designing the optimum spread code allocation priority in an order for maximizing a minimum value of the CIR caused by the interference between codes when the WH code having the code length 8 is used as the frequency domain spread code according to the exemplary embodiment of the present invention.

FIG. 4 to FIG. 7 shows simulation results of the methods A, B-1, A', and B-1' when SF=8 (the method A and the method A' are theoretically the same, but there is a difference therebetween due to a calculation error in an actual simulation).

In the simulation result, as the SF value is increased, the timing offset influence on the one spread block is increased, and the optimum spread code allocation order varies according to the timing offset.

While the simulation result slightly varies due to numerical errors as the timing offset is increased, it is approximately the same in every case.

According to the results in FIG. 4 to FIG. 7, the optimum allocation order for the timing offset below the 47 samples is an order of spread codes no. 1, no. 8, no. 4, no. 6, no. 7, no. 2, no. 3, and no. 5.

The optimum order for the timing offset between the 48 samples and the 87 samples is an order of the spread codes no. 1, no. 8, no. 4, no. 6, no. 2, no. 7, no. 3, and no. 5.

The optimum order for the timing offset between the 88 samples and the 128 samples is an order of the spread codes no. 1, no. 8, no. 4, no. 2, no. 6, no. 3, no. 7, and no. 5.

Accordingly, the scheduler of the base station allocates the WH orthogonal code to the plurality of user terminals or channels in the optimum allocation order.

In the exemplary embodiment of the present invention, when the number of user terminals is 1, the same performance may be achieved even though any spread code is used, and it is assumed that the spread code no. 1 is allocated.

In FIG. 4 to FIG. 7, the top left part of the diagram shows an optimum code selection result generated by using each method when the base station allocates a new spread code to a new user terminal to admit the new user terminal.

In an optimum allocation order for the WH orthogonal code, the spread code no. 8 is additionally allocated to the previously allocated spread code no. 1 when the timing offset of the samples less than 120 is provided.

In addition, when the timing offset of the samples more than 120 is provided, the spread code no. 4 is additionally allocated to the previously allocated spread code no. 1.

In a like manner, in the optimum allocation order for the WH orthogonal code, when the number of user terminals is increased from 1 to 3, the result shown in an upper middle diagram in FIG. 4 to FIG. 7 is used.

The result varies in each method according to the exemplary embodiment of the present invention.

As shown in the upper middle diagram in FIG. 4, in the optimum allocation order, the spread codes no. 4 and no. 8 are additionally allocated to the existing spread code no. 1 for the timing offset of the samples less than 120.

The optimum allocation order in the scheduler of the base station is an order of the spread codes no. 2 and no. 8 when the timing offset is between 120 samples and 190 samples, it is an order of the spread codes no. 3 and no. 8 when the timing offset is between 190 samples and 220 samples, and it is an order of the spread codes no. 2 and no. 4 when the timing offset is more than 220 samples.

In the simulation result in FIG. 5 to FIG. 7, the scheduler of the base station additionally allocates the spread codes no. 4 and no. 8 to the previously allocated spread code no. 1 when the timing offset is less than 170 samples, and it allocates the spread codes no. 2 and no. 4 to the previously allocated spread code no. 1 when the timing offset is more than 170 samples.

In the simulation result in FIG. 4 to FIG. 7, when the timing offset is less than 47 samples and the initial allocation spread code is the spread code no. 1, the optimum allocation order in the scheduler of the base station is an order of no. 8, no. 4, no. 6, no. 7, no. 2, no. 3, and no. 5.

When the number of the WH codes is SF (SF is an integer of more than 1), a new optimum allocation order, in which a result obtained by multiplying the respective elements of the WH codes by the respective elements of a predetermined WH code becomes the SF numbered WH codes, is obtained.

When the initial allocation code is set as the predetermined WH code, the new optimum allocation order becomes a result obtained by respectively multiplying each element of the initial allocation code by the initial allocation order (spread codes no. 8, no, 4, no, 6, no. 7, no. 2, no. 3, and no. 5) of the existing WH orthogonal code.

For example, when SF=8 and the spread code no. 2 is used as the initial allocation code in the scheduler of the base station in the MC-CDMA system, the optimum allocation is additionally performed in an order of the spread codes no. 7, no. 3, no. 5, no. 8, no. 1, no. 4, and no. 6 which are obtained by multiplying the spread codes no. 8, no. 4, no. 6, no. 7, no. 2, no. 3, and no. 5 by the spread code no. 2.

In the optimum allocation method, when SF=8 and the spread code no. 3 is used as the initial allocation code, the optimum allocation is additionally performed in an order of the spread codes no. 6, no. 2, no. 8, no. 5, no. 4, no. 1, and no. 7 which is obtained by multiplying the spread codes no. 8, no. 4, no. 6, no. 7, no. 2, no. 3, and no. 5 by the spread code no. 3.

FIG. 8, FIG. 9, and FIG. 10 respectively show the simulation results when SF=4, 8, and 16.

FIG. 8 shows the optimum spread code allocation priority design result according to the initial allocation code when the timing offset is less (timing offset <47 samples) and the WH code having the code length of 4 (SF=4) is used as the frequency domain spread code, according to the exemplary embodiment of the present invention.

In FIG. 8, rather than allocating the code no. 1, code no. 3 is initially allocated.

The respective spread codes (the WH orthogonal codes) are given as the code no. 1 (1,1,1,1), the code no. 2 (1,−1,1,−1), the code no. 3 (1,1,−1,−1), and the code no. 4 (1,−1,−1,1) in the WH code having the code length of 4.

Referring back to FIG. 3, when the timing offset is less than 47 samples and the code no. 1 is initially allocated, the optimum allocation order is the codes no. 1 -no. 4-no. 2-no. 3.

When the code no. 3 is initially allocated, the optimum allocation order is obtained by respectively multiplying the codes no. 1, no. 4, no. 2, and no. 3 by the code no. 3 (1,1,−1,−1).

The code no. 1×the code no. 3: (1,1,1,1)×(1,1,−1,−1) the code no. 3 (1,1,−1,−1)

The code no. 4×the code no 3: (1,−1,−1,1)×(1,1,−1,−1) =the code no. 2 (1,−1,1,−1)

The code no. 2×the code no. 3: (1,−1,1,1)×(1,1,−1,−1)=the code no. 4 (1,−1,−,1)

The code no. 3×the code no. 3: (1,1,−1,−1)×(1,1,−1,−1) =the code no. 1 (1,1,1,1).

Accordingly, when the code no. 3 is initially allocated, the optimum allocation order in the base station is an order of the codes no. 3, no. 2, no. 4, and no. 1.

FIG. 9 shows the optimum spread code allocation priority design result according to the initial allocation code when the timing offset is less (the timing offset <47 samples) and the WH code having the code length of 8 (SF=8) is used as the frequency domain spread code, according to the exemplary embodiment of the present invention.

A case that the code no. 2 is initially allocated rather than allocating the code no. 1 in FIG. 9 will now be described.

The respective spread codes (WH orthogonal codes) are given as the code no. 1 (1,1,1,1,1,1,1,1), the code no. 2 (1,−1,1,−1,1,−1,1,−1), the code no. 3 (1,1,−1,−1,1,1,−1,−1), the code no. 4 (1,−1,−1,1,1,−1,−1,1), the code no. 5 (1,1,1,1,−1,−1,−1,−1), the code no. 6 (1,−1,1,−1,−1,1,−1,1), the code no. 7 (1,1,−1,−1,−1,−1,1,1), and the code no. 8 (1,−1,−1, 1,−1,1, 1,−1) in the WH code having the code length of 8.

When the timing offset is less than 47 and the code no. 1 is initially allocated, the optimum allocation order is 1-8-4-6-7-2-3-5.

When the code no. 2 is initially allocated, the optimum allocation order is obtained by respectively multiplying the codes no. 1, no. 8, no. 4, no. 6, no. 7, no. 2, no. 3, and no. 5 by the code no. 2 (1,−1,1,−1,1,−1,1,−1).

The code no. 1×the code no. 2: (1,1,1,1,1,1,1,1)×(1,−1,1,−1,1,−1,1,−1) the code no. 2 (1,−1,1,−1,1,−1,1,−1)

The code no. 8×the code no. 2: (1,−1,−1,1,−1,1,1,−1)×(1,−1,1,−1,1,−1,1,−1)=the code no. 7 (1,1,−1,−1,−1,−1,1,1)

The code no. 4×the code no. 2: (1,−1,−1,1,1,−1,−1,1)×(1,−1,1,−1,1,−1,1,−1)=the code no. 3 (1,1,−1,−1,1,1,−1,−1)

The code no. 6×the code no. 2: (1,−1,1,−1,−1,1,−1,1)×(1,−1,1,−1,1,−1,1,−1)=the code no. 5 (1,1,1,1,−1,−1,−1,−1)

The code no. 7×the code no. 2: (1,1,−1,−1,−1,−1,1,1)×(1,−1,1,−1,1,−1,1,−1)=the code no. 1 (1,−1,−1,1,−1,1,1,−1)

The code no. 2×the code no. 2: (1,−1,1,−1,1,−1,1,−1)×(1,−1,1,−1,1,−1,1,−1)=the code no. 1 (1,1,1,1,1,1,1,1)

The code no. 3×the code no. 2: (1,1,−1,−1,1,1,−1,−1)×(1,−1,1,−1,1,−1,1,−1)=the (1,−1,−1,1,1,−1,−1,1)

The code no. 5×the code no. 2: (1,1,1,1,−1,−1,−1,−1)×(1,−1,1,−1,1,−1,1,−1)=the code no. 6 (1,−1,1,−1,−1,1,−1,1)

Accordingly, when the code no. 2 is initially allocated, the optimum allocation order is 2-7-3-5-8-1-4-6.

A case in which the code no. 3 is initially allocated rather than allocating the code no. 1 in FIG. 9 will now be described.

When the timing offset is less than 47 samples and the code no. 1 is initially allocated, the optimum allocation order is 1-8-4-6-7-2-3-5.

When the code no. 3 is initially allocated, the optimum allocation order is obtained by respectively multiplying the codes no. 1, no. 8, no. 4, no. 6, no. 7, no. 2, no. 3, and no. 5 by the code no. 3 (1,1,−1,−1,1,1,−1,−1).

The code no. 1×the code no. 3: (1,1,1,1,1,1,1,1)×(1,1,−1,−1,1,1,−1,−1) the code no. 3 (1,1,−1,−1,1,1,−1,−1)

The code no. 8×the code no. 3: (1,−1,−1,1,1,−1,1,1,−1)×(1,1,−1,−1,1,1,−1,−1)=the code no. 6 (1,−1,1,−1,−1,1,1,−1)

The code no. 4×the code no. 3: (1,−1,−1,1,1,−1,−1,1)×(1,1,−1,−1,1,1,−1,−1)=the code no. 2 (1,−1,1,−1,1,−1,1,−1)

The code no. 6×the code no. 3: (1,−1,1,−1,−1,1,−1,1)×(1,1,−1,−1,1,1,−1,−1)=the code no. 8 (1,−1,−1,1,1,−1,1,1,−1)

The code no. 7×the code no. 3: (1,1,−1,−1,−1,−1,1,1)×(1,1,−1,−1,1,1,−1,−1)=the code no. 5 (1,1,1,1,−1,−1,−1,−1)

The code no. 2×the code no. 3: (1,−1,1,−1,1,−1,1,−1)×(1,1,−1,−1,1,1,−1,−1)=the code no. 4 (1,−1,−1,1,1,−1,−1,1)

The code no. 3×the code no. 3: (1,1,−1,−1,1,1,−1,−1)×(1,1,−1,−1,1,1,−1,−1)=the code no. 1 (1,1,1,1,1,1,1,1)

The code no. 5×the code no. 3: (1,1,1,1,−1,−1,−1,−1)×(1,1,−1,−1,1,1,−1,−1)=the code no. 7 (1,1,−1,−1,−1,−1,1,1)

Accordingly, when the code no. 3 is initially allocated, the optimum allocation order is 3-6-2-8-5-4-1-7.

FIG. 10 shows the optimum spread code allocation priority design result according to the initial allocation code when the timing offset is less (the timing offset <47 samples) and the WH code having the code length of 16 (SF=16) is used as the frequency domain spread code.

A case in which the code no. 7 is initially allocated rather than allocating the code no. 1 in FIG. 10 will now be described. The spread codes (WH orthogonal codes) having the code length of 16 are given as follows.

The code no. 1 (1,1,1,1,1,1,1,1,1,1,1,1,1,1,1,1), the code no. 2 (1,−1,1,−1,1,−1,1,−1,1,−1,1,−1,1,−1,1,−1), the code no. 3 (1,1,−1,−1,1,1,−1,−1,1,1,−1,−1,1,1,−1,−1), the code no. 4 (1,−1,−1,1,1,−1,−1,1,1,−1,−1,1,1,−1,−1,1), the code no. 5 -1,−1,−1,−1), the code no. 6 (1,−1,1,−1,−1,1,−1,1,1,−1,1,−1,−1,1,−1,1,1), the code no. 7 (1,1,−1,−1,−1,−1,1,1,1,1,−1,−1,−1,−1,1,1), the code no. 8 (1,−1,−1,1,−1,1,1,−1,1,−1,−1,1,−1,1,1,−1), the code no. 9 -1,−1,−1,−1), the code no. 10 (1,−1,1,−1,1,−1,1,−1,−1,1,−1,1,−1,1,−1,1,1), the code no. 11 (1,1,−1,−1,1,1,−1,−1,−1,−1,1,1,−1,−1,1,1), the code no. 12 (1,−1,−1,1,1,−1,−1,1,1,−1,−1,1,1,−1,−1,1,−1,−1,1), the code no. 13 (1,1,1,1,−1,−1,−1,−1,−1,−1,−1,−1,1,1,1,1), the code no. 14 (1,−1,1,−1,−1,1,−1,1,−1,1,−1,1, 1,1,−1,1,−1), the code no. 15 (1,1,−1,−1,−1,−1,1,1,1,−1,1,1,1,1,−1,−1,1,−1,−1,1), and the code no. 16 (1,−1,−1,1,1,−1,1, 1,−1,1,1,−1,−1,1,−1,1).

When the timing offset is less than 57 samples and the code no. 1 is initially allocated, the optimum allocation order is 1-16-8-12-14-15-4-6-7-10-11-13-2-3-5-9.

When the code no. 7 is initially allocated, the optimum allocation order is obtained by respectively multiplying the codes no. 1, no. 16, no. 8, no. 12, no. 14, no. 15, no. 4, no. 6, no. 7, no. 10, no. 11, no. 13, no. 2, no. 3, no. 5, and no. 9 by the code no. 7 (1,1,−1,−1,−1,−1,1,1,1,1,−1,−1,−1,−1,1,1).

The code no. 1×the code no. 7: (1,1,1,1,1,1,1,1,1,1,1,1,1,1,1)×(1,1,−1,−1,−1,−1,1,1,1,1,−1,−1,−1,−1,1,1)=the code no. 7 (1,1,−1,−1,−1,−1,1,1,1,1,−1,−1,−1,−1,1,1)

The code no. 16×the code no. 7: (1,−1,−1,1,1,1,1,−1,1,−1,1,1,1,1,1)×(1,1,−1,−1,−1,−1,1,1,1,1,−1,−1,−1,−1,1,1,1) the code no. 10 (1,−1,1,−1,−1,1,−1,1,1,−1,1,−1,−1,1,−1,1)

The code no. 8×the code no. 7: (1,−1,−1,1,−1,1,1,1,−1,1,−1,−1,1,−1,1,1,−1)×(1,1,−1,−1,−1,−1,1,1,1,1,−1,−1,−1,−1,1,1)=the code no. 2 (1,−1,1,−1,1,−1,1,−1,1,−1,1,−1,1,−1,1,−1)

The code no. 12×the code no. 7: (1,−1,−1,1,1,−1,−1,1,−1,1,1,−1,1,−1,−1,1,1,−1,−1,1)×(1,1,−1,−1,−1,−1,1,1,1,1,−1,−1,−1,−1,1,1)=the code no. 14 (1,−1,1,−1,−1,1,−1,1,−1,1,−1,1,1,−1,1,−1)

The code no. 14×the code no. 7: (1,−1,1,−1,−1,1,−1,1,−1,1,−1,−1,1,−1,1,−1,1,1,−1,1,−1)×(1,1,−1,−1,−1,−1,1,1,1,1,−1,−1,−1,−1,1,1) the code no. 12 (1,−1,−1,1,1,−1,−1,1,1,−1,−1,1,1,−1,−1,1,−1)

The code no. 15×the code no. 7: (1,1,−1,−1,−1,−1,1,1,−1,−1,1,1,1,1,−1,−1,1)×(1,1,−1,−1,−1,−1,1,1,1,1,−1,−1,−1,−1,1,1) the code no. 9 (1,1,1,1,1,1,1,1,−1,−1,−1,−1,−1,−1,−1,−1)

The code no. 4×the code no. 7: (1,−1,−1,1,1,−1,−1,1,1,−1,−1,1,1,−1,−1,1,−1,1)×(1,1,−1,−1,−1,−1,1,1,1,1,−1,−1,−1,−1,1,1) the code no. 6

The code no. 6×the code no. 7: (1,1,−1,−1,−1,−1,1,1,1,1,−1,−1,−1,−1,1,1,1)×(1,1,−1,−1,−1,−1,1,14,1,1,−1,−1,−1,−1,1,1)=the code no. 4 (1,−1,−1,1,1,−1,−1,1,1,1,−1,−1,1,1,−1,−1,1,1)

The code no. 7×the code no. 7: (1,1,1,−1,−1,−1,−1,1,1,1,1,1,1,−1,−1,1,−1,−1,1,1)×(1,1,−1,−1,−1,−1,1,1,1,1,1,−1,−1,−1,−1,1,1)=the code no. 1 (1,1,1,1,1,1,1,1,1,1,1,1,1,1,1,1)

The code no. 10×the code no. 7: (1,−1,1,−1,1,−1,1,−1,−1,1,−1,1,−1,1,−1,1,1)×(1,1,−1,−1,−1,−1,1,1,1,1,−1,−1,−1,−1,1,1) the code no. 16 (1,−1,−1,1,1,−1,1,−1,−1,1,1,−1,−1,1,1,−1,−1,1,−1)

The code no. 11×the code no. 7: (1,1,−1,−1,1,1,−1,−1,−1,−1,1,1,−1,−1,1,1)×(1,1,−1,−1,−1,−1,1,1,1,1,−1,−1,−1,−1,1,1)=the code no. 13 (1,1,1,1,−1,−1,−1,−1,−1,−1,−1,−1,1,1,1,1)

The code no. 1333 the code no. 7: (1,1,1,1,−1,−1,−1,−1,−1,−1,−1,−1,1,1,1,1,1)×(1,1,−1,−1,−1,−1,1,1,1,1,−1,−1,−1,−1,1,1)=the code no. 11 (1,1,−1,−1,1,1,−1,−1,−1,−1,1,1,−1,−1,1,1)

The code no. 2×the code no. 7: (1,−1,1,−1,1,−1,1,−1,1,−1,1,−1,1,−1,1,−1,1,−1)×(1,1,−1,−1,−1,−1,1,1,1,1,−1,−1,−1,−1,1,1)=the code no. 8 (1,−1,−1,1,−1,1,1,−1,1,−1,−1,1,−1,1,1,−1)

The code no. 3×the code no. 7: (1,1,1,1,1,1,−1,−1,1,1,−1,−1,−1,−1,1,1,−1,−1)×(1,1,−1,−1,−1,−1,1,1,1,1,−1,−1,−1,−1,1,1)=the code no. 5 (1,1,1,1,−1,−1,−1,−1,1,1,1,1,−1,−1,−1,−1)

The code no. 5×the code no. 7: (1,1,1,1,1,−1,−1,1,1,1,1,1,1,−1,−1,1)×(1,1,−1,−1,−1,−1,1,1,1,1,1,−1,−1,−1,−1,1,1)=the code no. 3 (1,1,−1,−1,1,1,−1,−1,1,1,−1,−1,1,1,−1,−1)

The code no. 9×the code no. 7: (1,1,1,1,1,1,1,1,−1,−1,−1,−1,−1,−1,−1,−1,−1)×(1,1,−1,−1,−1,−1,1,1,1,1,1,−1,−1,−1,−1,1,1)=the code no. 15 (1,1,−1,−1,−1,−1,1,1,−1,−1,1,1,1,1,−1,−1)

Accordingly, when the code no. 7 is initially allocated, the optimum allocation order is 7-10-2-14-12-9-6-4-1-16-13-11-8-5-3-15.

The optimum spread code allocation order varies according to the timing offset because a linear phase rotation by the timing offset at a frequency domain affects the auto-correlation and cross-correlation of the spread code according to a spread code pattern.

Taking a binary WH code for example, in a result vector obtained by multiplying the respective elements of the previously allocated spread codes by the respective elements of the newly allocated spread code, the number of −1s and the number of +1s are the same. An average value of the cross-correlation is 0 when there is no timing offset in an ideal case. When there is the timing offset, since a distortion occurs by the timing offset as a distance between −1 and +1 is increased, the average value of the cross-correlation is not 0, and therefore the interference occurs between codes.

In addition, while it has been assumed that the initial allocation spread code is the WH code no. 1 in the simulation, the performance will be the same due to characteristics of the WH code when any WH code among the SF WH codes (here, SF is an integer of more than 1) is used as the initial allocation spread code, which is because the result obtained by multiplying the respective elements of the SF number WH codes by the respective elements of a predetermined WH code becomes the SF number WH codes again according to the characteristics of the WH code.

For example, [1 1 1 1], [1 −1 1 −1], [1 1 −1 −1], and [1 −1 −1 1] are possible for the WH code having the code length of 4, and when the four codes [1 1 1 1], [1 −1 1 −1], [1 1 −1 −1], and [1 −1 −1 1] are multiplied by a predetermined code [1 −1 1 −1], the result is [1 −1 1 −1], [1 1 1 1], [1 −1 −1 1], [1 1 −1

−1]. That is, the order of codes is changed, but the same combinations of the WH codes are formed.

Accordingly, when an arbitrary $i^{th}$ code selected from among the SF WH codes (i is an integer more than 1) is used as the initial allocation code, the additional code allocation order is shown as FIG. 8, FIG. 9, and FIG. 10, and performance relating to the interference between codes may be the same.

According to the exemplary embodiment of the present invention, in the base station of the MC-CDMA communication system using multi-carriers, since the optimum allocation order of the codes to be used according to its priority among the spread codes provided by using a plurality of carriers is determined when the WH code is allocated, the interference caused by the channel fading or the timing offset may be minimized between the codes.

In addition, the interference caused by the channel fading or the timing offset is minimized between the codes, the interference affecting the MC-CDMA link is minimized, and therefore unnecessary performance degradation may be reduced.

The above-described methods and apparatuses are not only realized by the exemplary embodiment of the present invention, but, on the contrary, are intended to be realized by a program for realizing functions corresponding to the configuration of the exemplary embodiment of the present invention or a recording medium for recording the program.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for allocating a frequency domain spread code by a base station of a multi-carrier code division multiple access (MC-CDMA) communication system having a plurality of user terminals and a scheduler, the method comprising:
   a) establishing a code allocation priority based on interference between previously allocated spread codes $C_A$ and a newly allocated spread code $c_i$ so as to minimize the interference caused by a channel fading or a synchronization error according to a transmitting or receiving timing offset, when the scheduler of the base station allocates a subcarrier group to the plurality of user terminals or channels; and
   b) allocating the spread code to the plurality of user terminals or channels according to the established priority, by the scheduler of the base station,
   wherein the scheduler of the base station establishes a predetermined spread code $c_i$ among the spread codes to be an initial allocation code, and allocates the spread codes in an order of the spread codes obtained by multiplying respective elements of the spread codes in the code allocation priority by respective elements of the initial allocation code.

2. The method of claim 1, wherein a Walsh-Hadamard (WH) orthogonal code is used as the spread code to identify respective user terminal signals or channel signals by the base station.

3. The method of claim 1, wherein the scheduler of the base station establishes the code allocation priority in an order that minimizes a sum of the interference caused by signals using the previously allocated spread codes $C_A$.

4. The method of claim 3, further comprising:
   c) allocating an optimum spread code $c^\dagger_{B1}$ minimizing the interference to signals having a maximum interference caused by a signal applied to the newly allocated spread code among the signals using the previously allocated spread codes; and
   d) allocating an optimum spread code $c^\dagger_{B2}$ minimizing an average interference caused from the signal allocated to the newly allocated spread code $c_i$, to the signal using the previously allocated spread codes $C_A$.

5. The method of claim 1, wherein the scheduler of the base station establishes the code allocation priority in an order that minimizes a maximum cross-correlation value between the previously allocated spread codes $C_A$ and the newly allocated spread code $c_i$.

6. The method of claim 1, wherein the scheduler of the base station establishes the code allocation priority in an order that minimizes a sum of interference power between respective signals using the previously allocated spread codes $C_A$ and a signal using the spread code $c_i$ to be newly allocated.

7. A method for allocating a frequency domain spread code by a base station of a multi-carrier code division multiple access (MC-CDMA) communication system having a plurality of user terminals and a scheduler, the method comprising:
   a) establishing a code allocation priority based on interference between previously allocated spread codes $C_A$ and a newly allocated spread code $c_i$ so as to minimize the interference caused by a channel fading or a synchronization error according to a transmitting or receiving timing offset, when the scheduler of the base station allocates a subcarrier group to the plurality of user terminals or channels; and
   b) allocating the spread code to the plurality of user terminals or channels according to the established priority, by the scheduler of the base station,
   wherein the interference is defined as interference caused by a signal using the newly allocated spread code $c_i$ at the previously allocated spread codes $C_A$ and is calculated as shown in equation $$|I_{A,i}| = \left| \sum_{c_j \in C_A} \sum_{k=0}^{SF-1} c_i^*[k] c_j[k] e^{j2\pi \frac{k+k_0}{N} \frac{\tau_e}{T_s}} \right|$$

wherein

SF denotes a given frequency domain spreading factor, $c_i$ denotes a newly allocated spread code which is not included in the previously allocated spread codes $C_A$, c[k] denotes a combination of the frequency domain spread codes respectively having a code length of SF (k=0,1, 2, ..., and SF-1), N denotes a size of fast Fourier transform (FFT) of an orthogonal frequency division multiplexing (OFDM) signal, $\tau_e$ denotes a timing offset, $T_s$ denotes a sample length of the OFDM signal, and $k_0$ denotes an index of a first subcarrier of a subcarrier group applied to the frequency domain spread code.

8. The method of claim 7, wherein the spread code is defined as a spread code $c^\dagger_A$ having a minimum interference by the signal using the previously allocated spread code $C_A$ and is calculated as shown in equation $$c_A^\dagger = \underset{c_i \notin C_A}{\mathrm{argmin}} |I_{A,i}|.$$

9. A method for allocating a frequency domain spread code by a base station of a multi-carrier code division multiple access (MC-CDMA) communication system having a plurality of user terminals and a scheduler, the method comprising:
   a) establishing a code allocation priority based on interference between previously allocated spread codes $C_A$ and a newly allocated spread code $c_i$ so as to minimize the interference caused by a channel fading or a synchronization error according to a transmitting or receiving timing offset, when the scheduler of the base station allocates a subcarrier group to the plurality of user terminals or channels; and
   b) allocating the spread code to the plurality of user terminals or channels according to the established priority, by the scheduler of the base station,
   wherein the interference is defined as interference $I_{B,i,j}$ caused when a predetermined spread code $c_j$ and the newly allocated spread code $c_i$ are concurrently received with the timing offset $\tau_e$ through the frequency resource and is calculated in the equation $$I_{B,i,j} = \sum_{k=0}^{SF-1} c_i^*[k] c_j[k] e^{j2\pi \frac{k+k_0}{N} \frac{\tau_e}{T_s}}$$

wherein
SF is a spreading factor at a frequency domain and denotes a code length of the frequency domain spread code,
$c_i[k]$ denotes an $k^{th}$ ($k=0,1,\ldots$, and SF-1) element of the newly allocated spread code $c_i$,
$k_0$ denotes an index of a subcarrier transmitting a first element $c_i[0]$ of the newly allocated spread code $c_i$,
N denotes a size of fast Fourier transform of an orthogonal frequency division multiplexing (OFDM) signal,
$\tau_e$ denotes a timing offset, and
$T_s$ denotes a sample length of the OFDM signal.

10. The method of claim 9, wherein the spread code is defined as an optimum spread code $c^\dagger_{B1}$ minimizing the interference between the spread codes and is calculated in equation $$c_{B1}^\dagger = \underset{c_i \notin C_A}{\mathrm{argmin}} \left\{ \underset{c_j \in C_A}{\max} |I_{B,i,j}| \right\}.$$

11. The method of claim 9, wherein the spread code is defined as an optimum spread code $c^\dagger_{B2}$ minimizing the average interference and is calculated in the equation $$c_{B2}^\dagger = \underset{c_i \notin C_A}{\mathrm{argmin}} \sum_{c_j \in C_A} |I_{B,i,j}|^2.$$

12. A method for allocating a frequency domain spread code by a base station of a multi-carrier code division multiple access (MC-CDMA) communication system having a plurality of user terminals and a scheduler, the method comprising:
   a) establishing a spread code allocation priority based on a carrier-to-interference ratio (CIR) obtained from signals using previously allocated spread codes and a newly allocated spread code, so as to minimize an interference between codes that is caused by a channel fading or a synchronization error according to a transmitting or receiving timing offset, when the scheduler of the base station allocates a subcarrier group to a plurality of user terminals or channels; and
   b) allocating the spread code to the plurality of user terminals or channels according to the established spread code allocation priority, by the scheduler of the base station,
   wherein the scheduler of the base station establishes a predetermined spread code $c_j$ among spreading factor (SF) WH codes to be an initial allocation code, wherein SF is an integer more than 1, and wherein the scheduler allocates the spread codes in an order of the spread codes obtained by multiplying respective elements of the spread codes in the code allocation priority by respective elements of the initial allocation code.

13. The method of claim 12, wherein a Walsh-Hadamard (WH) orthogonal code is used as the spread code to identify respective user terminal signals or channel signals by the base station.

14. The method of claim 12, wherein the scheduler of the base station establishes the spread code allocation priority in an order that maximizes the CIR according to the interference caused by a signal using the previously allocated spread codes $C_A$.

15. The method of claim 12, wherein the scheduler of the base station establishes the spread code allocation priority in an order that maximizes a minimum CIR between the previously allocated spread codes $C_A$ and the newly allocated spread code $c_i$.

16. The method of claim 12, wherein the scheduler of the base station establishes the spread code allocation priority in an order that maximizes a sum of CIRs between respective signals using the previously allocated spread codes $C_A$ and a signal using the newly allocated spread code $c_i$.

17. A method for allocating a frequency domain spread code by a base station of a multi-carrier code division multiple access (MC-CDMA) communication system having a plurality of user terminals and a scheduler, the method comprising:
   a) establishing a spread code allocation priority based on a carrier-to-interference ratio (CIR) obtained from signals using previously allocated spread codes and a newly allocated spread code, so as to minimize an interference between codes that is caused by a channel fading or a synchronization error according to a transmitting or receiving timing offset, when the scheduler of the base station allocates a subcarrier group to a plurality of user terminals or channels; and
   b) allocating the spread code to the plurality of user terminals or channels according to the established spread code allocation priority, by the scheduler of the base station,
   wherein the spread code is defined as an optimum spread code $c^\dagger_A$ based on the CIR $$CIR \frac{|I_{B,i,i}|}{|I_{A,i}|}$$

and is calculated in the equation $$c_A^\dagger = \underset{c_i \notin C_A}{\operatorname{argmax}} \frac{|I_{B,i,i}|}{|I_{A,i}|}$$

wherein
$|I_{A,i}|$ denotes an interference occurring at the previously allocated spread codes $C_A$ by a signal allocated to the newly allocated spread code, and
$|I_{B,i,i}|$ denotes a received auto-correlation value for the spread code.

18. The method of claim 17, wherein the received auto-correlation value $|I_{B,i,i}|$ for the spread code is calculated in the equation $$|I_{B,i,i}| = K \left| \sum_{k=0}^{SF-1} e^{j2\pi \frac{k+k_0}{N} \frac{\tau_e}{T_s}} \right|$$

$$= K \left| e^{j2\pi \frac{k_0}{N} \frac{\tau_e}{T_s}} \frac{1 - e^{j2\pi \frac{SF}{N} \frac{\tau_e}{T_s}}}{1 - e^{j\frac{2\pi}{N} \frac{\tau_e}{T_s}}} \right|$$

$$= K \left| \frac{\sin\left(\pi \frac{SF}{N} \frac{\tau_e}{T_s}\right)}{\sin\left(\frac{\pi}{N} \frac{\tau_e}{T_s}\right)} \right|$$

wherein
SF is a frequency domain spreading factor and denotes a length of the frequency domain spread code,
$\tau_e$ denotes a timing offset,
$T_s$ denotes a sample length of the OFDM signal,
$k_0$ denotes a subcarrier index transmitted by the first element of the newly allocated spread code, and
a constant number $K = |ci[k]|^2$.

19. A method for allocating a frequency domain spread code by a base station of a multi-carrier code division multiple access (MC-CDMA) communication system having a plurality of user terminals and a scheduler, the method comprising:
a) establishing a spread code allocation priority based on a carrier-to-interference ratio (CIR) obtained from signals using previously allocated spread codes and a newly allocated spread code, so as to minimize an interference between codes that is caused by a channel fading or a synchronization error according to a transmitting or receiving timing offset, when the scheduler of the base station allocates a subcarrier group to a plurality of user terminals or channels; and
b) allocating the spread code to the plurality of user terminals or channels according to the established spread code allocation priority, by the scheduler of the base station,
wherein the spread code is defined as an optimum spread code $c^\dagger_{B1'}$ based on the CIR and is calculated in the equation $$c_{B1'}^\dagger = \underset{c_i \notin C_A}{\operatorname{argmax}} \left\{ \underset{c_j \in C_A}{\min} \frac{|I_{B,i,i}|}{|I_{B,i,j}|} \right\}$$

wherein
$|I_{B,i,i}|$ denotes a received auto-correlation value for the spread code, and
$|I_{B,i,j}|$ denotes an interference occurring at a signal using a predetermined spread code $c_j$ among the previously allocated spread codes $C_A$ and caused by a signal allocated to the newly allocated spread code $c_i$.

20. A method for allocating a frequency domain spread code by a base station of a multi-carrier code division multiple access (MC-CDMA) communication system having a plurality of user terminals and a scheduler, the method comprising:
a) establishing a spread code allocation priority based on a carrier-to-interference ratio (CIR) obtained from signals using previously allocated spread codes and a newly allocated spread code, so as to minimize an interference between codes that is caused by a channel fading or a synchronization error according to a transmitting or receiving timing offset, when the scheduler of the base station allocates a subcarrier group to a plurality of user terminals or channels; and
b) allocating the spread code to the plurality of user terminals or channels according to the established spread code allocation priority, by the scheduler of the base station,
wherein the spread code is defined as an optimum spread code $c^\dagger_{B2}$ based on the CIR and is calculated in the equation $$c_{B2}^\dagger = \underset{c_i \notin C_A}{\operatorname{argmin}} \sum_{c_j \in C_A} \frac{|I_{B,i,i}|^2}{|I_{B,i,j}|^2},$$

wherein
$|I_{B,i,i}|$ denotes a received auto-correlation value for the spread code, and
$|I_{B,i,j}|$ denotes an interference occurring at a signal using a predetermined spread code $c_j$ among the previously allocated spread codes $C_A$ and caused by a signal allocated to the newly allocated spread code $c_i$.

* * * * *